(12) United States Patent
Boylan, III et al.

(10) Patent No.: US 6,799,326 B2
(45) Date of Patent: Sep. 28, 2004

(54) INTERACTIVE TELEVISION PROGRAM GUIDE SYSTEM WITH LOCAL ADVERTISEMENTS

(75) Inventors: Peter C. Boylan, III, Tulsa, OK (US); William L. Thomas, Bixby, OK (US); Joel G. Hassell, Arvada, CO (US); Michael D. Ellis, Boulder, CO (US)

(73) Assignee: United Video Properties, Inc., Tulsa, OK (US)

( * ) Notice: Subject to any disclaimer, the term of this patent is extended or adjusted under 35 U.S.C. 154(b) by 136 days.

(21) Appl. No.: 10/188,273

(22) Filed: Jul. 1, 2002

(65) Prior Publication Data

US 2002/0166120 A1 Nov. 7, 2002

Related U.S. Application Data

(62) Division of application No. 09/110,667, filed on Jul. 7, 1998.

(51) Int. Cl.[7] .............................. H04N 7/16; H04N 7/10; H04N 5/445; H04N 7/18; G06F 17/60

(52) U.S. Cl. .............................. 725/35; 725/22; 725/28; 725/32; 725/36; 725/42; 725/54; 725/82; 725/93; 725/116; 725/138; 725/146; 705/10

(58) Field of Search ............................. 725/22, 28, 32, 725/35, 36, 42, 54, 82, 93, 116, 138, 146; 705/10

(56) References Cited

U.S. PATENT DOCUMENTS

| | | | |
|---|---|---|---|
| 4,694,490 A | 9/1987 | Harvey et al. | 380/20 |
| 4,750,213 A | 6/1988 | Novak | 455/67 |
| 4,814,883 A | 3/1989 | Perine et al. | 358/181 |
| 5,155,591 A | 10/1992 | Wachob | 358/86 |
| 5,283,639 A * | 2/1994 | Esch et al. | 348/6 |
| 5,335,277 A | 8/1994 | Harvey et al. | 380/20 |

(List continued on next page.)

FOREIGN PATENT DOCUMENTS

| | | | |
|---|---|---|---|
| WO | WO 89/02682 | 3/1989 | H04K/7/00 |
| WO | WO 95/07003 | 3/1995 | H04N/5/782 |
| WO | WO 95/31069 | 11/1995 | H04N/7/087 |
| WO | WO 95/32585 | 11/1995 | H04N/7/10 |
| WO | WO 96/09721 | 3/1996 | H04N/7/025 |
| WO | WO 96/34486 | 10/1996 | H04N/1/00 |
| WO | WO 96/34491 | 10/1996 | H04N/7/025 |
| WO | WO 96/41471 | 12/1996 | H04N/7/088 |
| WO | WO 97/04595 | 2/1997 | H04N/7/08 |
| WO | WO 97/18675 | 5/1997 | H04N/7/173 |
| WO | WO 97/31480 | 8/1997 | H04N/7/10 |
| WO | WO 97/42763 | 11/1997 | H04N/7/173 |
| WO | WO 97/48230 | 12/1997 | H04N/7/00 |
| WO | WO 97/49237 | 12/1997 | H04N/5/445 |
| WO | WO 97/49241 | 12/1997 | H04N/7/10 |
| WO | WO 97/49242 | 12/1997 | H04N/7/10 |
| WO | WO 98/06219 | 2/1998 | H04N/7/10 |
| WO | WO 98/27723 | 6/1998 | H04N/5/445 |
| WO | WO 99/45702 | 9/1999 | H04N/5/445 |

*Primary Examiner*—Vivek Srivastava
*Assistant Examiner*—Son P. Huynh
(74) *Attorney, Agent, or Firm*—Fish & Neave

(57) ABSTRACT

A program guide system is provided in which local advertisements may be distributed to interactive television program guides implemented on the user television equipment associated with a television distribution facility such as a cable system headend. The local advertisements contain information that is directed toward the particular users in a local area. The local advertisements may be displayed when a user selects a related global advertisement. The local advertisements may also be displayed automatically by cycling global advertisements and local advertisements. Advertisements may be blocked based on content or time shifted. Policies regarding advertisement usage may be enforced.

20 Claims, 22 Drawing Sheets

U.S. PATENT DOCUMENTS

| | | | |
|---|---|---|---|
| 5,357,276 A | | 10/1994 | Banker .......................... 348/7 |
| 5,424,770 A | * | 6/1995 | Schmelzer et al. ........... 725/36 |
| 5,485,197 A | | 1/1996 | Hoarty .......................... 348/7 |
| 5,539,822 A | | 7/1996 | Lett ............................ 380/20 |
| 5,559,548 A | | 9/1996 | Davis et al. .................. 348/6 |
| 5,559,549 A | | 9/1996 | Hendricks et al. ............ 348/6 |
| 5,585,866 A | | 12/1996 | Miller et al. ................ 348/731 |
| 5,589,892 A | | 12/1996 | Knee et al. ................. 348/731 |
| 5,600,364 A | | 2/1997 | Hendricks et al. ............ 348/1 |
| 5,600,366 A | | 2/1997 | Schulman ...................... 348/9 |
| 5,600,573 A | | 2/1997 | Hendricks et al. ...... 364/514 R |
| 5,635,978 A | | 6/1997 | Alten et al. .................... 348/7 |
| 5,659,350 A | | 8/1997 | Hendricks et al. ............ 348/6 |
| 5,661,516 A | | 8/1997 | Carles .......................... 348/8 |
| 5,682,195 A | | 10/1997 | Hendricks et al. ............ 348/6 |
| 5,689,648 A | | 11/1997 | Diaz et al. .................... 705/26 |
| 5,708,478 A | | 1/1998 | Tognazzini ................. 348/552 |
| 5,710,815 A | | 1/1998 | Ming et al. .................... 380/20 |
| 5,734,853 A | | 3/1998 | Hendricks et al. .......... 395/352 |
| 5,740,549 A | | 4/1998 | Reilly et al. ................... 705/14 |
| 5,757,417 A | | 5/1998 | Aras et al. ................... 348/10 |
| 5,760,821 A | | 6/1998 | Ellis et al. .................... 348/10 |
| 5,761,601 A | | 6/1998 | Nemirofsky ............... 455/3.1 |
| 5,774,170 A | | 6/1998 | Hite et al. ..................... 348/9 |
| 5,774,534 A | | 6/1998 | Mayer ................... 379/142.01 |
| 5,805,154 A | | 9/1998 | Brown ........................ 345/327 |
| 5,815,671 A | * | 9/1998 | Morrison ............... 395/200.77 |
| 5,830,068 A | | 11/1998 | Brenner et al. ................ 463/42 |
| 5,838,314 A | | 11/1998 | Neel et al. ................... 345/327 |
| 5,892,535 A | | 4/1999 | Allen et al. .................... 725/36 |
| 5,907,366 A | | 5/1999 | Farmer et al. .............. 348/478 |
| 5,917,830 A | | 6/1999 | Chen et al. .................. 370/487 |
| 5,929,849 A | | 7/1999 | Kikinis ........................ 345/327 |
| 5,940,073 A | | 8/1999 | Klosterman et al. ......... 345/721 |
| 6,002,393 A | * | 12/1999 | Hite et al. ................... 345/719 |
| 6,014,137 A | | 1/2000 | Burns .......................... 345/334 |
| 6,029,045 A | | 2/2000 | Picco et al. .................... 725/34 |
| 6,049,824 A | * | 4/2000 | Simonin ...................... 709/219 |
| 6,064,376 A | | 5/2000 | Berezowski et al. ........... 725/42 |
| 6,067,303 A | | 5/2000 | Aaker et al. ................. 370/474 |
| 6,075,551 A | * | 6/2000 | Berezowski et al. ........... 348/9 |
| 6,078,348 A | | 6/2000 | Klosterman et al. ........... 725/40 |
| 6,160,545 A | | 12/2000 | Eyer et al. ................... 345/721 |
| 6,160,546 A | | 12/2000 | Thompson et al. ......... 345/327 |
| 6,173,271 B1 | | 1/2001 | Goodman et al. ............. 705/40 |
| 6,177,931 B1 | * | 1/2001 | Alexander et al. .......... 345/327 |
| 6,191,780 B1 | * | 2/2001 | Martin et al. .............. 715/500.1 |
| 6,209,129 B1 | | 3/2001 | Carr ............................. 725/42 |
| 6,209,130 B1 | | 3/2001 | Rector, Jr. et al. ............ 725/50 |
| 6,463,585 B1 | * | 10/2002 | Hendricks et al. ............ 725/35 |
| 6,477,579 B1 | | 11/2002 | Kunkel et al. .............. 709/229 |
| 6,546,556 B1 | * | 4/2003 | Kataoka et al. ............... 725/35 |
| 2002/0092017 A1 | * | 7/2002 | Klosterman et al. .......... 725/35 |
| 2003/0110499 A1 | | 6/2003 | Klosterman et al. .......... 725/35 |

* cited by examiner

INTERACTIVE TELEVISION PROGRAM GUIDE SYSTEM WITH LOCAL ADVERTISEMENTS

CROSS-REFERENCE TO RELATED APPLICATIONS

This is a divisional of U.S. patent application Ser. No. 09/110,667, filed Jul. 7, 1998, which is hereby incorporated by reference in its entirety.

BACKGROUND OF THE INVENTION

This invention relates to interactive television program guides, and more particularly, to techniques for providing local advertising with such interactive television program guides.

Passive television program guides provide a scrolling or paged list of television program listings on a dedicated television channel. A television user may view the television program listings by tuning to the dedicated channel. The upper portion of a passive program guide display may be used to display advertising videos and associated text descriptions. The content of the text descriptions may be targeted toward particular regions.

Interactive television program guides allow television users to perform more advanced operations, such as displaying program listings in formats that are selected by the user, genre searching, pay-per-view ordering, etc. Interactive program guides are typically implemented on microprocessor-based set-top boxes. Program listings data is transmitted to the set-top boxes from a centralized data distribution facility via the user's cable system headend. The program listings data is typically stored in memory in the set-top box, where it may be accessed by the interactive program guide.

Interactive program guides may be used to display advertisements, as described in Knudson et al. U.S. patent application Ser. No. 09/034,939, filed Mar. 4, 1998, Knudson et al. U.S. patent application Ser. No. 09/070,604, filed Apr. 30, 1998, Knudson et al. U.S. patent application Ser. No. 09/070,555, filed Apr. 30, 1998, and Boylan, III et al. U.S. patent application Ser. No. 09/070,700, filed Apr. 30, 1998, which are hereby incorporated by reference herein in their entireties. Interactive program guide advertisements provide the user with useful information on various products and services. For example, interactive program guide advertisements may be used to promote upcoming television programs. Interactive program guide advertisements may also be used to promote non-programming products and services.

Because interactive television program guide advertisements may be distributed nationally from a central facility, such advertisements are suitable for promoting products and services on a national basis. If interactive program guide advertisements are distributed only on a national basis, however, users will not be provided with as much useful local advertising information as might otherwise be possible.

It is therefore an object of the present invention to provide an interactive television program guide system in which users may be provided with local program guide advertising.

SUMMARY OF THE INVENTION

This and other objects of the invention are accomplished in accordance with the principles of the present invention by providing a system in which local (i.e., non-global) advertisements are provided to interactive television program guides that are implemented on the user television equipment associated with a television distribution facility.

The data for the local advertisements may be distributed to the interactive television program guides in a number of ways. For example, local advertising data may be included in a global data stream that is transmitted from a main facility to multiple television distribution facilities. The global data stream may also contain global advertising data and program guide data. The television distribution facilities distribute the global data stream to the user television equipment. The interactive program guides in the user television equipment may extract the local advertising data that is addressed to that user television equipment or to its associated television distribution facility.

Another approach involves inserting local advertising data into the global data stream. Local advertising data may be inserted into a portion of the bandwidth of the global data stream that is reserved for local advertisements. Local advertising data may also be inserted into the global data stream by overwriting certain global advertisements. If desired, local advertising data may be transmitted from the television distribution facility to the user television equipment using a separate data stream. These advertising distribution schemes are illustrative. Any suitable form of digital multiplexing may be used to distribute global and local advertisements on single or multiple data streams if desired.

Local advertisements may be displayed on the user television equipment by the interactive television program guide. Local advertisements may be displayed whenever a user selects a displayed global advertisement. A local advertisement that is displayed in this way may have content that is related to the content of the selected global advertisement. If desired, the program guide may cycle global and local advertisements on the user television equipment. Local advertisements may also be shown in place of certain global advertisements if desired.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
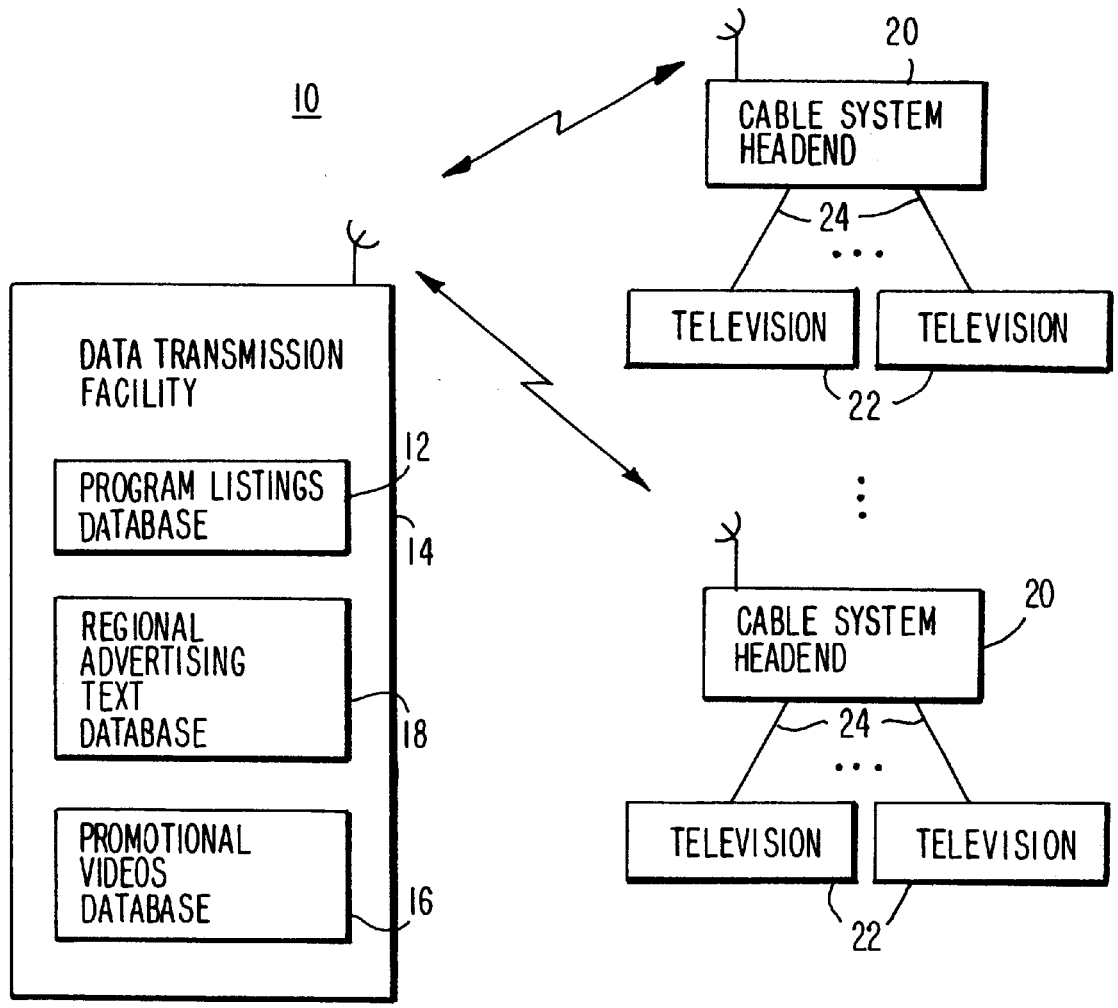
FIG. 1 is a diagram of a conventional arrangement for providing a passive television program guide channel.

A conventional passive television program guide system 10 is shown in FIG. 1. Data for television program listings such as channel, title, and broadcast time information is stored in a program listings database 12 in a data transmission facility 14. Promotional videos are stored in promotional videos database 16. Advertising text associated with the promotional videos is stored in regional advertising text database 18. The promotional videos are distributed nationally via satellite in a global video stream. The associated advertising text is distributed in a global data stream. Program listings are also distributed in a global data stream.

The global video and data streams are transmitted to multiple cable system headends 20. The cable system headends are typically in different geographic regions. The cable system headend in each region contains a computer that extracts the advertising text appropriate for that region and the television program listings for the region. The region-appropriate advertising text is combined on a single screen with the promotional videos and the program listings for that region. The combined screen is provided to cable system subscribers at televisions 22 via cable links 24 on a dedicated television channel. The layout of a typical passive program guide screen is shown in FIG. 2.

Figure 2:
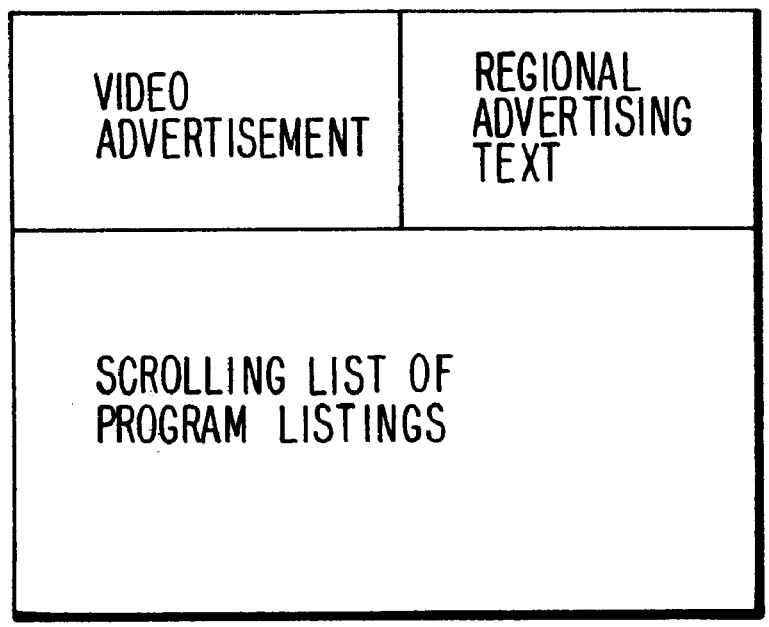
FIG. 2 is a display provided by a conventional passive program guide.

The passive program guide system of FIGS. 1 and 2 provides users with program guide information, promotional information, and regionalized advertising information without requiring that the user have any special television equipment other than a standard television. However, because the program guide of FIGS. 1 and 2 is a passive program guide, it is not capable of providing the user with any interactive features.

Figure 3:
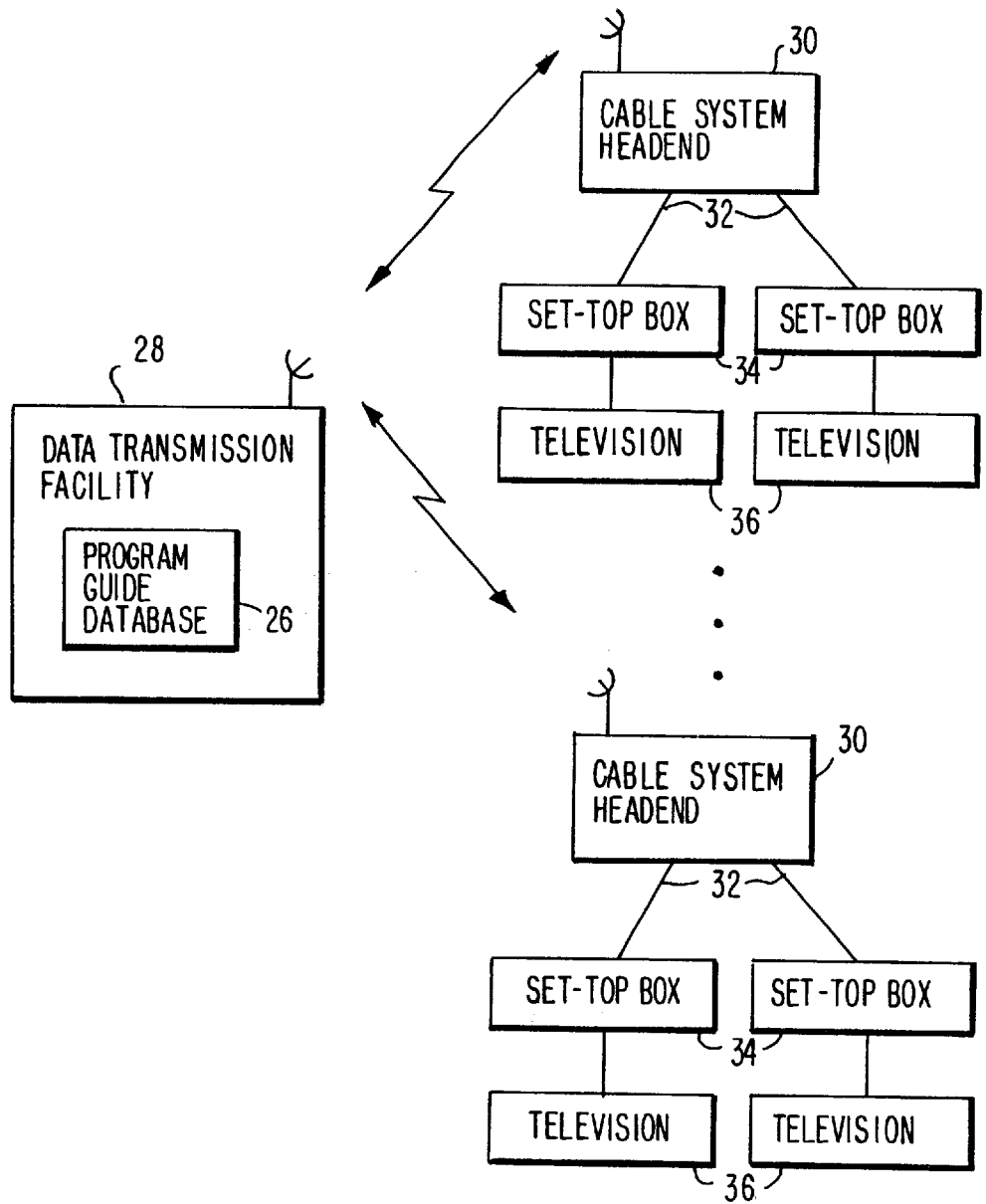
FIG. 3 is a diagram of a conventional interactive program guide data distribution system.

A conventional interactive television program guide system is shown in FIG. 3. Program listings information such as program titles, channels, descriptions, etc. is stored in program guide database 26 of data transmission facility 28. The program listings information is distributed nationally via satellite to multiple cable system headends 30. Cable system headends 30 are located in different geographic regions across the country. Each headend 30 redistributes the program listings information via cable links 32 to the set-top boxes 34 of the users for that headend. Program listings information is typically distributed to set-top boxes 34 using an out-of-band channel, digital in-band channel, or the vertical blanking interval (VBI) of one of the channels on cable links 32.

Set-top boxes 34 contain memory in which the program listings information is stored. Set-top boxes 34 also contain a processor for implementing the interactive television program guide. The program guide implemented on each set-top box 34 is capable of displaying various program listings on an associated television 36. For example, program listings for pay-per-view programs may be displayed, as shown in the upper screen of FIG. 4. If the user selects one of the pay-per-view listings 38, the program guide may display ordering information 40, as shown in the lower screen of FIG. 4. Ordering information 40 may contain information such as pay-per-view ordering telephone number 42 that is specific to the user's geographic region. Pay-per-view ordering telephone numbers are distributed nationally, but each set-top box 34 extracts only the pay-per-view ordering telephone number appropriate for the user's geographic location.

Figure 4:
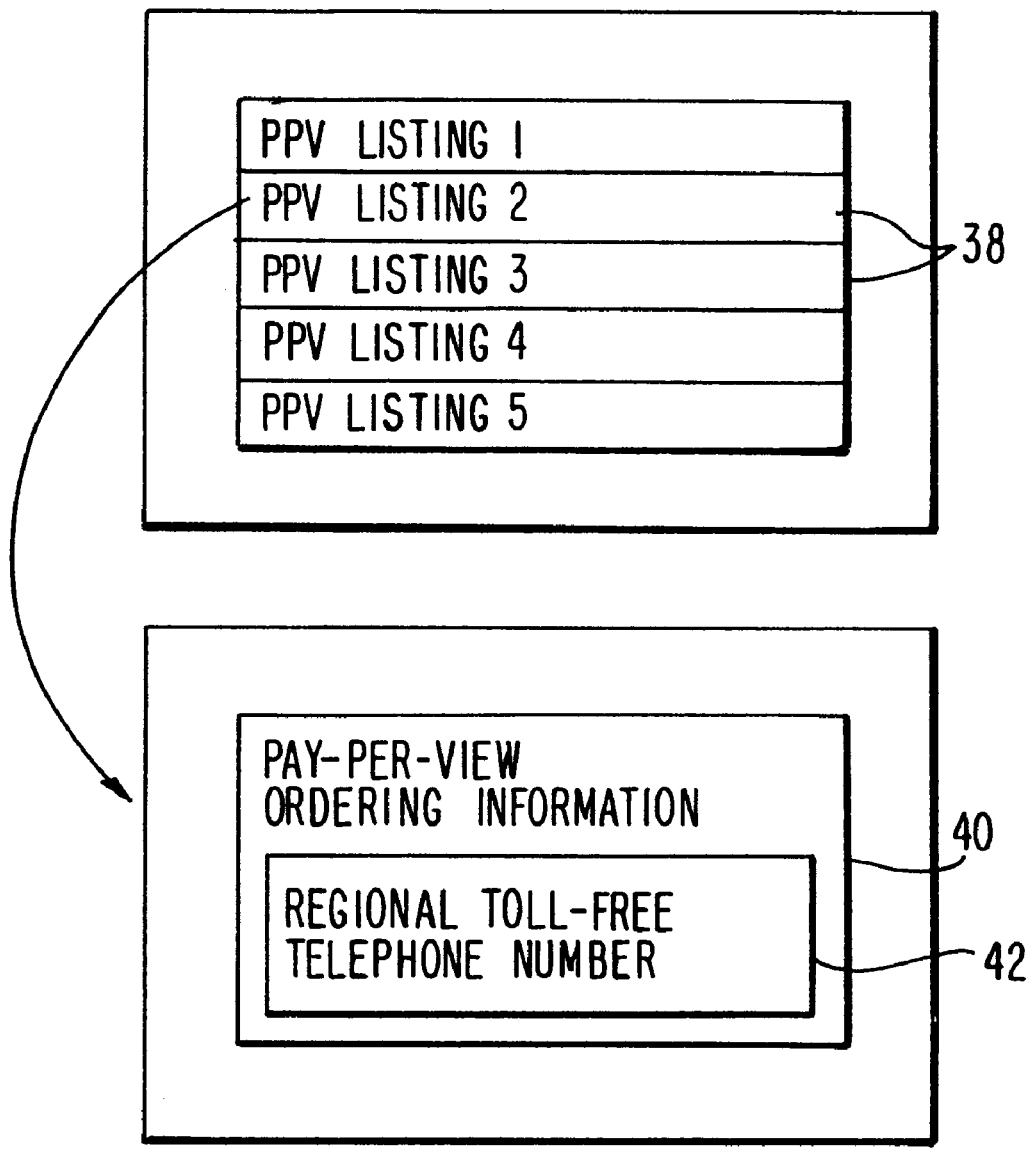
FIG. 4 is a diagram showing how a conventional program guide may display pay-per-view ordering information when a user selects a program listing in a conventional program guide pay-per-view program listings screen.

Although the arrangement of FIGS. 3 and 4 allows users to obtain regionalized telephone number information, the arrangement of FIGS. 3 and 4 is unable to provide local advertising information.

Figure 5:
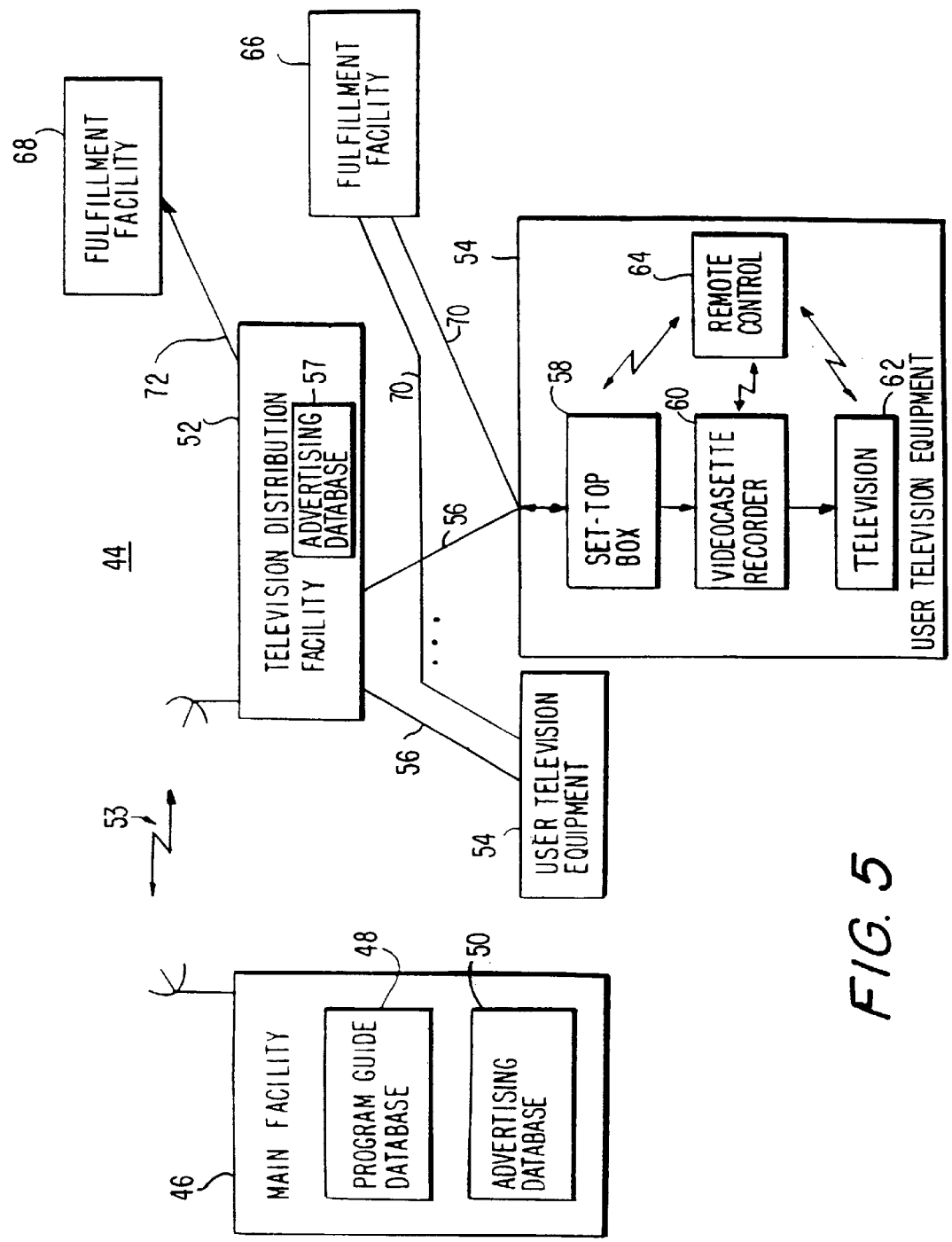
FIG. 5 is a diagram of an illustrative interactive television program guide system for providing local advertisements in accordance with the present invention.

An illustrative program guide system 44 in accordance with the present invention is shown in FIG. 5. Main facility 46 contains a program guide database 48 for storing program guide information such as television program guide listings data, pay-per-view ordering information, television program promotional information, etc. Main facility 46 also contains an advertising database 50 for storing advertising information. Information from databases 48 and 50 may be transmitted to multiple television distribution facilities such as television distribution facility 52 via communications links such as communications link 53. Link 53 may be a satellite link, a telephone network link, a high-speed telephone link, a cable or fiber-optic link, a microwave link, a combination of such links, or any other suitable communications path. If it is desired to transmit video signals (e.g., for advertising and promotional videos) over link 53 in addition to data signals, a relatively high bandwidth link such as a satellite link is generally preferable to a relatively low bandwidth link such as a telephone line.

Television distribution facility 52 is a facility for distributing television signals to users, such as a cable system headend, a broadcast distribution facility, or a satellite television distribution facility.

The program guide information transmitted by main facility 46 to television distribution facility 52 includes television program listings data such as program times, channels, titles, descriptions, etc. Transmitted program information also includes pay program data such as pricing information for individual programs and subscription channels, time windows for ordering programs and channels, telephone numbers for placing orders that cannot be impulse ordered, etc.

Figure 6:
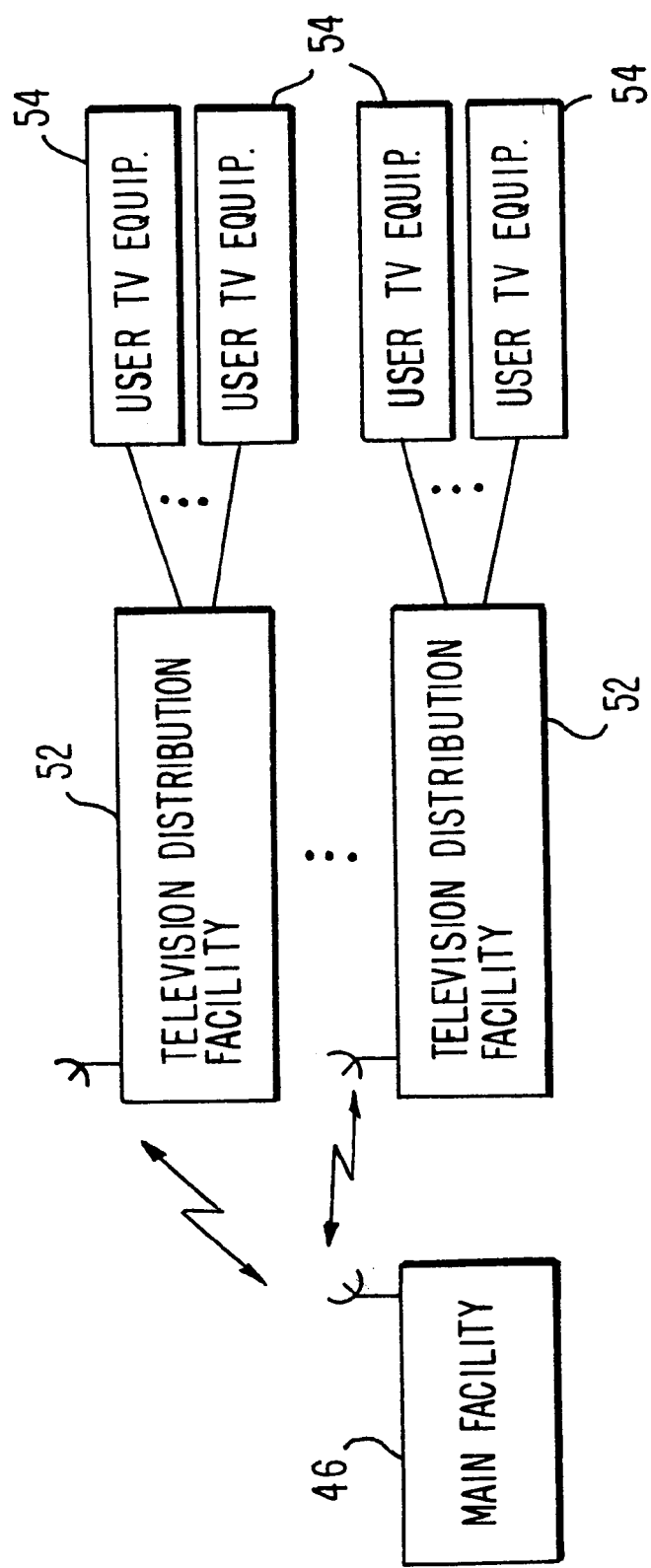
FIG. 6 is a diagram illustrating how data may be distributed to multiple television distribution facilities in accordance with the present invention.

The advertising information transmitted by main facility 46 to television distribution facility 52 may include text, graphics, and video advertisements for various products and services. Global advertisements (e.g., national advertisements or advertisements distributed uniformly over some other suitable wide-scale geographic area) may be distributed from main facility 46 to multiple television distribution facilities 52, as shown in FIG. 6. Only one television distribution facility 52 is shown in FIG. 5 to avoid overcomplicating the drawing.

Each television distribution facility 52 distributes advertisements to users at associated user television equipment 54 via communications links 56. If desired, some advertising information may be provided using advertising database 57 in television distribution facility 52. For example, local advertising may be provided using advertising database 57. Advertising database 57 may also be used to temporarily cache national advertising data transmitted from main facility 46. Advertising database 57 may contain a server capable of handling text, graphics, and video.

User television equipment 54 may be any suitable equipment for providing television to the user that contains sufficient processing capabilities to implement an interactive television program guide. Paths 56 may be cable links, fiber-optic links, satellite links, broadcast links, or other suitable link or combination of such links. Any suitable communications scheme may be used to transmit data over paths 56, including in-band transmissions, vertical blanking interval transmissions, out-of-band transmissions, digital transmissions, analog transmissions, cable transmissions, satellite transmissions, over-the-air transmissions, multichannel multipoint distribution services (MMDS) transmissions, etc.

The data distribution technique that is used to distribute data on paths 56 depends on the type of information that is being distributed. For example, text and graphics may be distributed over an out-of-band channel using an out-of-band modulator. Video information may also be distributed in this way, although large quantities of video information may be more efficiently distributed using one or more digital channels on path 56. Such digital channels may also be used for distributing text and graphics.

Each user has a receiver, which is typically a set-top box such as set-top box 58, but which may be other suitable television equipment such as an advanced television receiver into which circuitry similar to set-top-box circuitry has been integrated or a personal computer television (PC/TV). Data such as program guide data may be distributed to set-top boxes periodically. Television distribution facility 52 may also poll set-top boxes 58 periodically for certain information (e.g., pay program account information or information regarding programs that have been purchased and viewed using locally-generated authorization techniques).

Main facility 46 preferably contains a processor to handle information distribution tasks. Each set-top box 58 preferably contains a processor to handle tasks associated with implementing the interactive television program guide. Television distribution facility 52 may contain a processor for handling tasks associated with data distribution.

Each set-top box 58 is typically connected to an optional videocassette recorder 60 so that selected television programs may be recorded. Each videocassette recorder 60 is connected to a television 62. To record a program, the interactive television program guide implemented on set-top box 58 tunes set-top box 58 to a particular channel and sends control signals to videocassette recorder 60 (e.g., using an infrared transmitter) that direct videocassette recorder 60 to start and stop recording at the appropriate times.

During use of the program guide, television program listings, advertisements, and other information may be displayed on television 62. Each set-top box 58, videocassette recorder 60, and television 62 may be controlled by one or more remote controls 64 or any other suitable user input interface such as a wireless keyboard, mouse, trackball, dedicated set of keys, etc. A typical remote control 64 has cursor keys for positioning a highlight region on the program guide screen and an "OK" or select button for selecting a highlighted item on the screen. Other typical remote control buttons include function buttons such as a record button, channel up and down buttons, volume control buttons, numeric keys, etc.

Communications paths 56 preferably have sufficient bandwidth to allow television distribution facility 52 to distribute television programming, program listings information, advertisements, and other information to user television equipment 54. Multiple television and audio channels (analog, digital, or both analog and digital) may be provided to user television equipment 54 via communications paths 56. If desired, certain data such as program listings data may be distributed by one or more distribution facilities that are separate from television distribution facility 52 using communications paths that are at least partly separate from communications paths 56.

Certain functions such as pay program purchasing or the purchasing of products or services may require that user television equipment 54 transmit data to television distribution facility 52 over communications paths 56. If desired, such data may be transmitted over telephone lines or other separate communications paths. If functions such as these are provided using facilities separate from television distribution facility 52, some of the communications involving user television equipment 54 may be made directly with the separate facilities.

Users of the interactive television program guide may interactively order additional information, products, or services. For example, a user may place an order by selecting an advertisement displayed in the program guide. Such orders may be satisfied by fulfillment facilities 66 and 68. If desired, orders may be transmitted directly to fulfillment facilities such as fulfillment facility 66 via links 70, which may be telephone links, the Internet, or other suitable communications links. Orders may also be transmitted to television distribution facility 52 via links 56 (e.g., two-way cable), where the billing system of the television distribution facility may be used. After the television distribution facility 52 has processed the user's order, television distribution facility 52 may transmit the order to fulfillment facility 68 via link 72.

A number of suitable techniques may be used to distribute videos related to advertising from television distribution facility 52 to user television equipment 54. For example, if each path 56 includes a number of traditional analog television channels, one or more of these channels may be used to support a number of digital channels. The bandwidth of each analog channel that is used to support digital channels may support ten or more of such digital channels. If desired, videos may be provided from television distribution facility 52 in a continuously looped arrangement on these digital channels. Information provided to set-top box 58 may then be used to determine which digital channels to tune to when it is time to display a desired video. For example, if it is desired to display a local advertisement in place of a national advertisement, set-top box 58 may tune to a digital channel containing the local advertisement at an appropriate time. Alternatively, videos may be provided by television distribution facility 52 on demand. With this approach, set-top box 58 and television distribution facility 52 may negotiate to determine a channel on which to provide the desired video. Videos that originate from main facility 46, a separate facility, or from television distribution facility 52 (e.g., from advertising database 57) may be distributed to user television equipment 54 using these or other suitable techniques. If desired, videos and other information may be distributed to user television equipment 54 using servers located at network nodes between television distribution facility 52 and user television equipment 54.

Graphics information for advertisements may be downloaded from television distribution facility 52 to user television equipment 54 periodically (e.g., once every 10 minutes or once per day). The graphics information may be accessed locally when needed by the program guide. Alternatively, graphics information may be provided in a continuously-looped arrangement on one or more digital channels on paths 56. With such a continuously-looped arrangement, a map indicating the location of the latest graphics information is preferably downloaded periodically to set-top boxes 58 (e.g., once per day). This allows the content on the digital channels to be updated. The program guides on set-top boxes 58 may use the map to locate desired graphics information on the digital channels. Another approach involves using advertising database 57 to provide the graphics information after a set-top box 58 and television distribution facility 52 have negotiated to set up a download operation. A bitmap or other suitable set of graphics information may then be downloaded from the advertising database to the set-top box. If desired, television distribution facility 52 may download instructions informing the set-top box where the desired graphics information can be located on a particular digital channel. The graphics information can be updated periodically if user television equipment 54 is informed of the current location of the graphics information.

Text information for advertisements may be distributed from television distribution facility 52 to user television equipment 54 using the same paths that are used for distributing program guide data. For example, advertising data may be distributed over an out-of-band channel on paths 56. The text information may be stored locally in set-top boxes 58 and updated periodically (e.g., once per day).

Videos, graphics, and text for advertisements may also be distributed from television distribution facility 52 to user television equipment 54 using a combination of these techniques or any other suitable technique.

Television distribution facility 52 distributes both global and local advertisements to user television equipment 54. Global advertisements are national advertisements or advertisements that are distributed uniformly over some other such large geographic area. A typical global advertisement might be for a certain brand of automobile, because the same automobiles are typically available nationwide. Local advertisements are advertisements whose content is generally tailored to a particular region or to a particular group of users. Examples of typical regions for which local advertisements may be provided include cities, metropolitan areas, states, multi-state regions (e.g., New England), etc. A typical local advertisement for one such region might be for an automobile dealership, because automobile dealerships usually serve only certain geographic regions. An example of a special group of users for which local advertisements may be provided is the group of users that are associated with all of the cable systems of a given cable system operator. A typical local advertisement for this type of group might be an advertisement for a new cable system channel or a promotional offer.

Global advertisements are preferably distributed to all television distribution facilities 52 in a global area in parallel. For example, if television distribution facilities 52 are cable system headends or groups of headends at various locations around the country and link 53 is a satellite link, a national advertisement for an automobile may be transmitted to, e.g., thousands of such cable system headends via satellite at substantially the same time. Such wide-scale distribution makes efficient use of the parallel data distribution capabilities of system 44. Parallel distribution of global data by satellite is, however, only one illustrative way in which global advertising data may be distributed. Any other suitable data distribution technique, including serial data distribution schemes and data distribution schemes using other types of communications links 53, may be used if desired.

Figure 7:
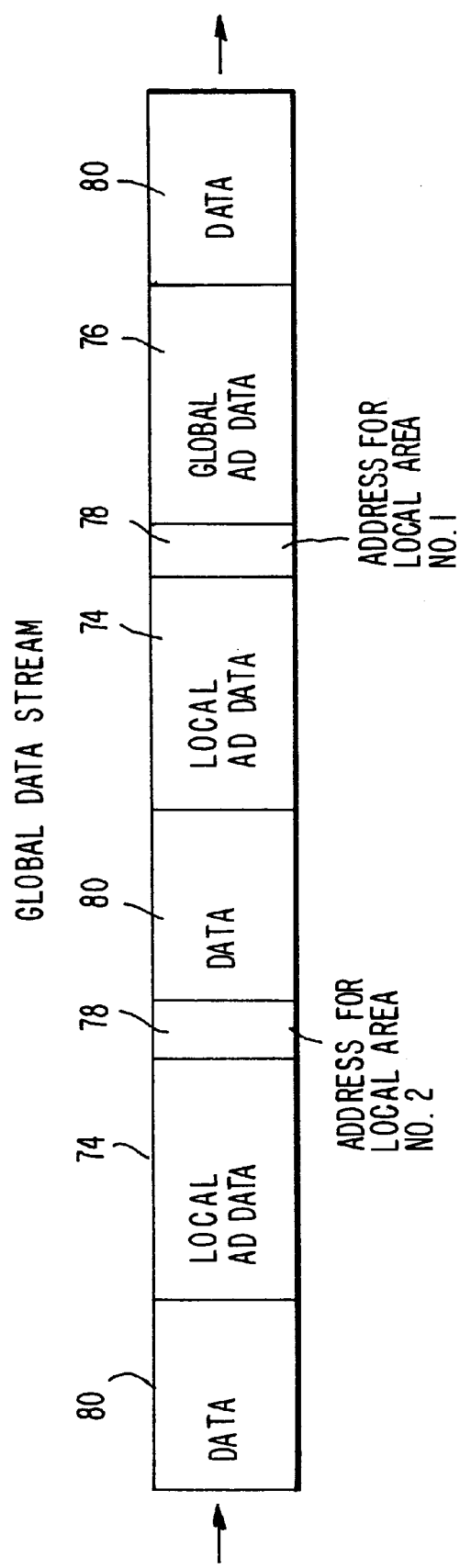
FIG. 7 is a diagram illustrating how local advertising data may be distributed from the main facility as part of a global data stream in accordance with the present invention.

Local advertisements may be provided to television distribution facilities 52 for redistribution to user equipment 54 using a number of different techniques. As shown in FIG. 7, local advertising data 74 may be transmitted from main facility 46 to television distribution facility 52 as part of the same global data stream in which global advertising data 76 is transmitted. The local advertising data for each local advertisement has an associated address 78. Each address 78 defines the destination of its associated local advertisement. The destination is typically a local geographic area such as a city or a state, but may be a non-geographic type of destination such as all cable systems operated by the same cable system operator, all households with a certain income level (as determined, for example, by zip code information or other suitable resource), or any other suitable criteria for defining a non-global destination.

Other data 80 such as program listings data may also be transmitted in the global data stream. This type of distribution scheme may be most appropriate for local advertisements containing text and graphics, although local advertisements containing video may also be distributed in this way if desired.

Figure 8:
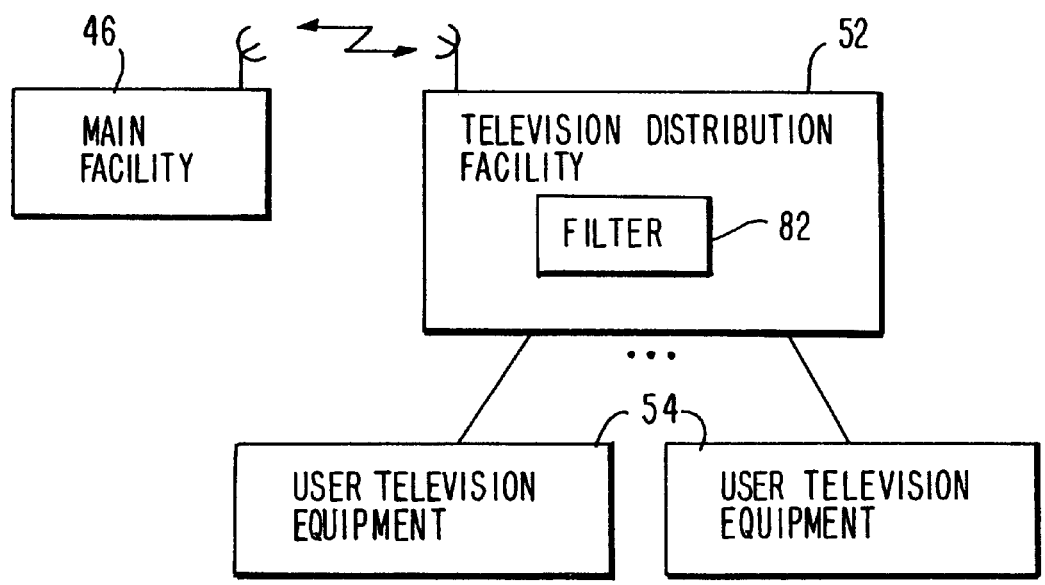
FIG. 8 is a diagram of an illustrative program guide system in which the television distribution facility contains a filter for filtering out all but the local advertisements addressed to the user television equipment associated with that television distribution facility.

As shown in FIG. 8, each television distribution facility such as television distribution facility 52 may be provided with a corresponding local advertisement filter 82. When main facility 46 transmits the global data stream of FIG. 7 to television distribution television facility 52, filter 82 extracts the local advertisements from the data stream that are addressed to either the local area in which television distribution facility 52 and its associated user television equipment 54 are located or to a group of users associated with television distribution facility 52. Users are therefore provided with local advertisements whose content is tailored to the user's geographic location or whose content is tailored to the intended group of recipients of the local advertisement (as in the case with an advertisement addressed to all of the cable customers of a particular cable system operator, etc.).

Figure 9:
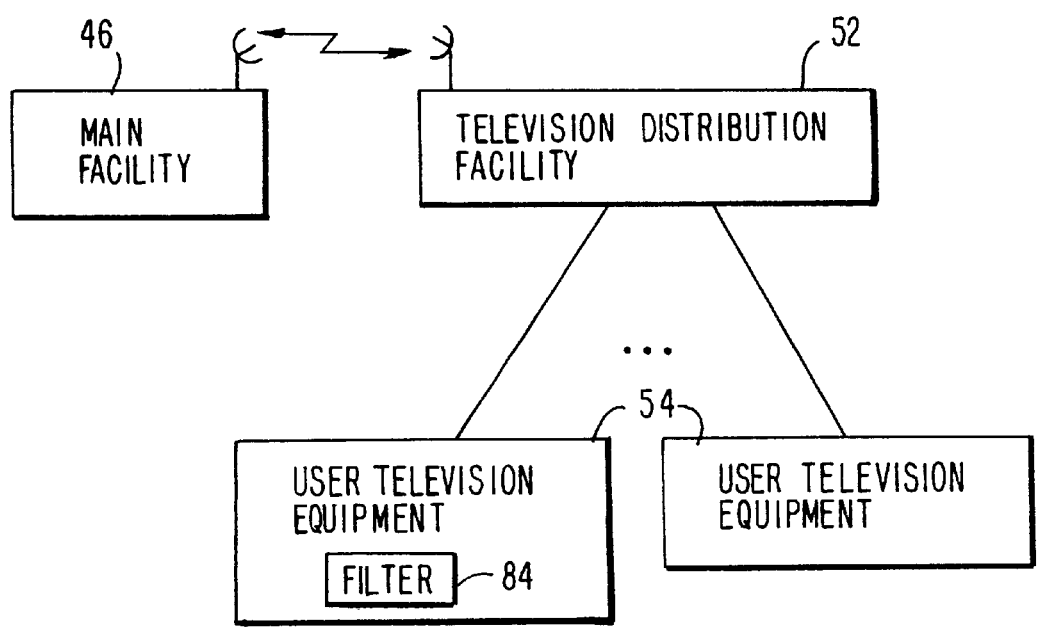
FIG. 9 is a diagram of an illustrative program guide system in which filters are provided in the user television equipment for filtering out all but the local advertisements addressed to that user television equipment.

As shown in FIG. 9, filtering may be accomplished using a filter 84 that is located at the user television equipment. With the FIG. 9 arrangement, the set-top box 58 (FIG. 5) or other such device in each user's user television equipment 54 filters out all but the local advertisements that are addressed to that user's user television equipment 54.

If desired, filters may be used at both television distribution facilities 52 and user television equipment 54. With such an arrangement, the filter at each television distribution facility 52 may provide a first layer of filtering and the filters at the user television equipment 54 associated with each television distribution facility 52 may provide a second layer of filtering.

Figure 10:
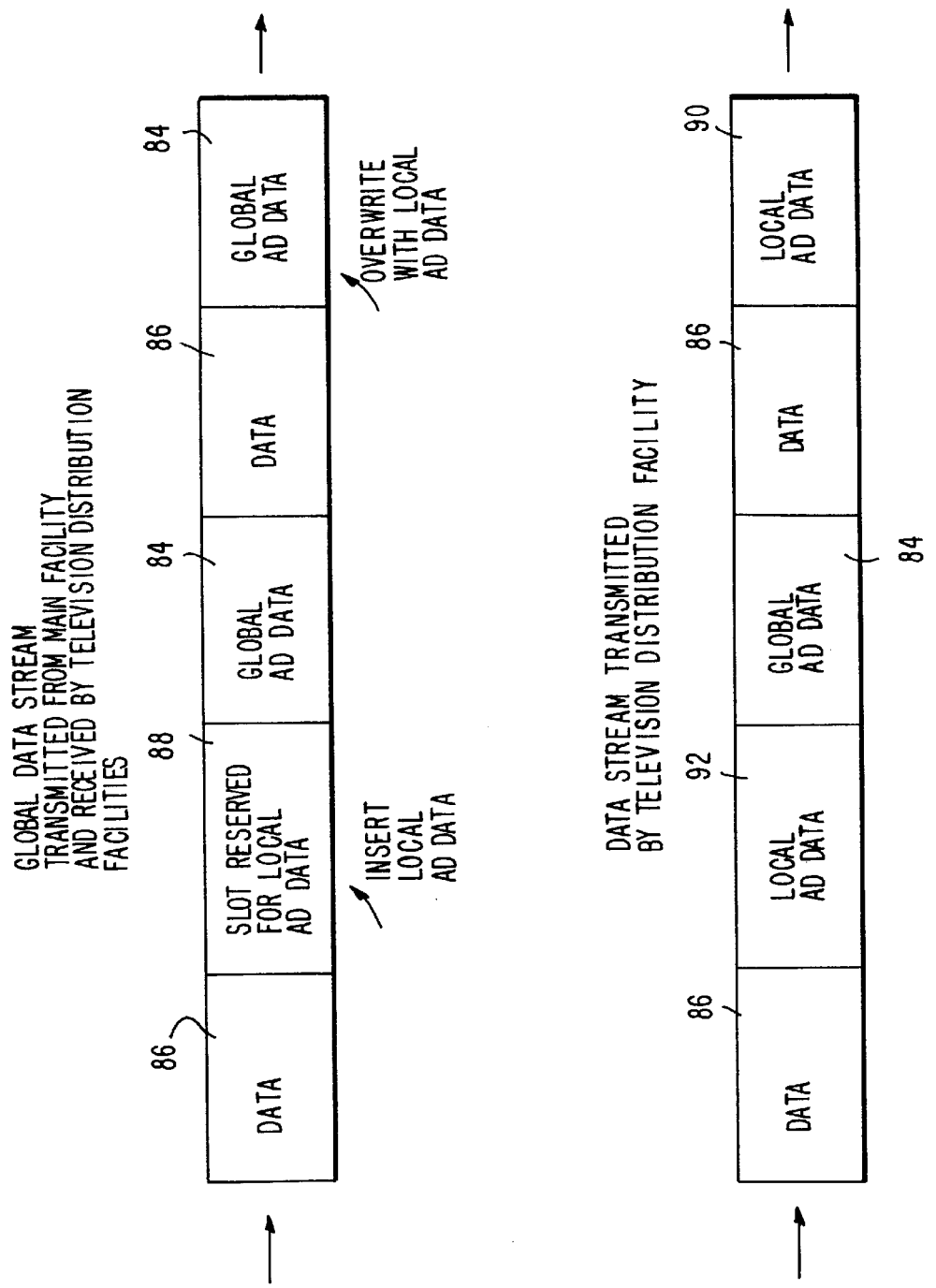
FIG. 10 is a diagram illustrating how local advertising data may be inserted into a global data stream in accordance with the present invention.

Another way in which local advertisements may be provided to users is shown in FIG. 10. As shown in the upper data stream of FIG. 10, the global data stream transmitted from main facility 46 to television distribution facility 52 may contain global advertising data 82 and other data 86 such as program guide data. A portion of the bandwidth of the global data stream may be reserved for subsequent insertion of local advertising data. For example, slots such as slot 88 may be reserved for data insertion. Local advertising data is inserted into slot 88 at television distribution facility 52. Local advertising data may also be inserted into the global data stream by overwriting an existing global advertisement.

Figure 11:
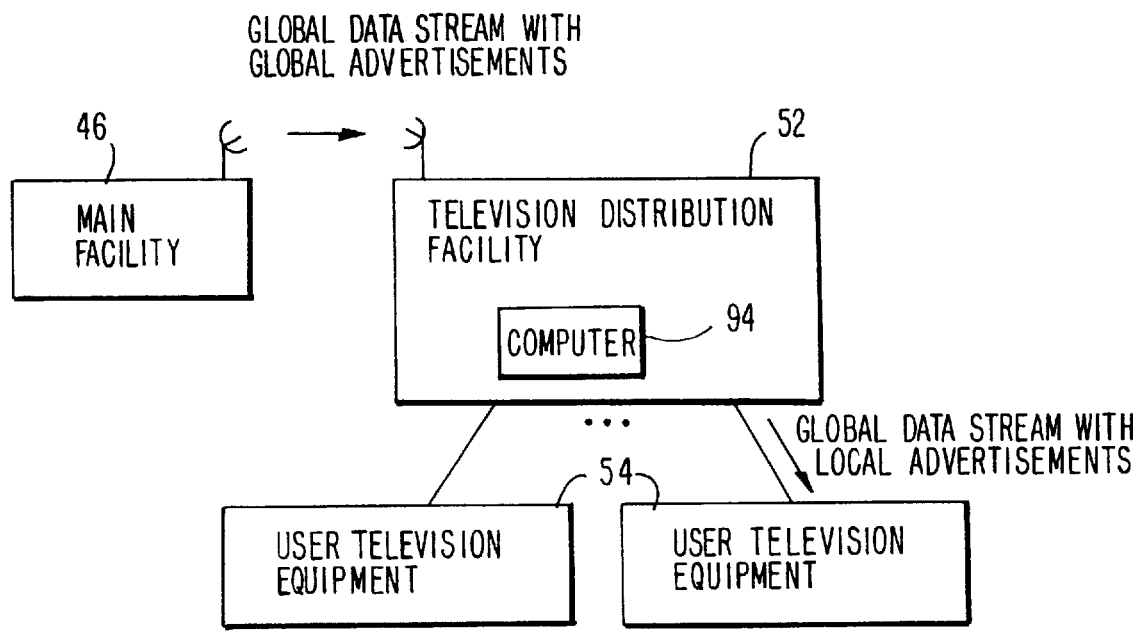
FIG. 11 is a diagram illustrating how local advertising data may be inserted into a global data stream at a television distribution facility in accordance with the present invention.

After the local advertisement has been inserted into the global data stream, television distribution facility 52 may transmit the lower data stream of FIG. 10 to user television equipment 54, as shown in FIG. 11. As shown in the lower stream of FIG. 10, local advertising data 90 has been inserted by overwriting global advertising data 84 and local advertising data 92 has been inserted into the slot 88 that was reserved for insertion of a local advertisement. Because the local advertisements are inserted into the data stream at television distribution facility 52, the local advertisements that are provided to the user television equipment 54 associated with that television distribution facility 52 are appropriate for the users' geographic region, and in general no filtering at user television equipment 54 is required if the local advertisements are intended for all users in that region. If the local advertisements are intended for a certain subset of the users in that geographic region (e.g., all users with a particular demographic trait such as a given income level), additional filtering may be used at user television equipment 54. If desired, local advertisements may be provided to the user in a separate data stream transmitted from the television distribution facility in parallel with the global data stream, as shown in FIG. 12.

Figure 12:
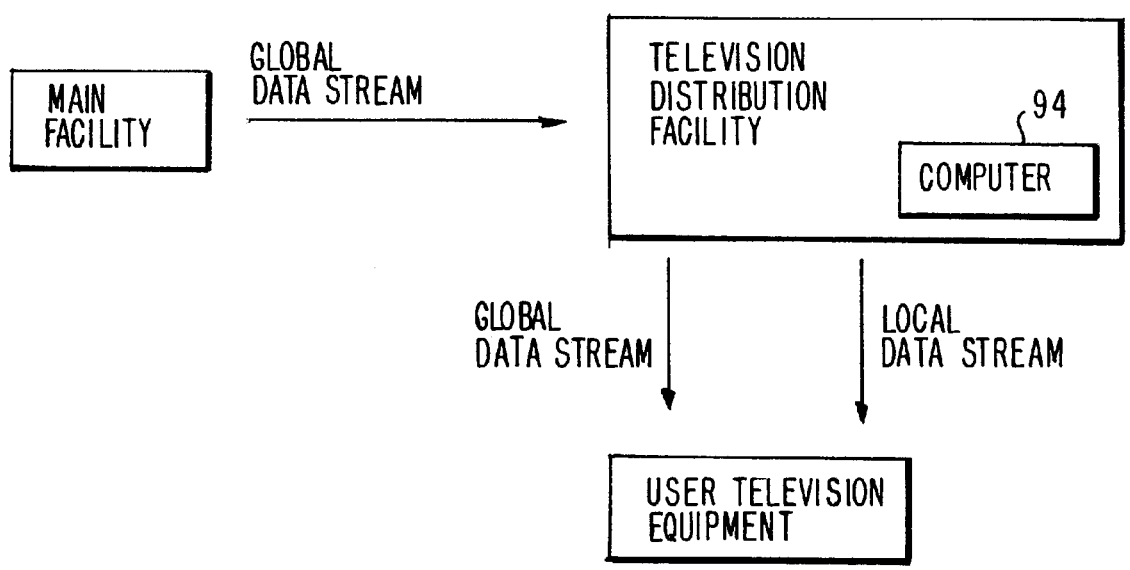
FIG. 12 is a diagram illustrating how a separate local data stream may be provided when local advertisements are transmitted from the television distribution facility to the user television equipment in accordance with the present invention.

FIGS. 11 and 12 show how a computer 94 at the television distribution facility may be used in providing the local data. Computer 94 may be used to implement or manage an advertising database such as advertising database 57 of FIG. 5. Local advertisements may be retrieved from advertising database 57 by computer 94 as needed for transmission to user television equipment 54.

The program guide implemented on user television equipment 54 may present local advertisements to the user in a number of different ways. For example, the program guide may initially display a program guide screen such as program guide screen 95, which is shown as the upper screen in FIG. 13. Program guide screen 95 contains program listings region 96, which contains a grid, list, or table of program listings. Program guide screen 95 also contains logos 98 and global panel advertisements 100. A user may, for example, select one of global advertisements 100 by positioning a highlight such as highlight 102 on a desired advertisement with remote control cursor keys and pressing a select or OK remote control button. In response, the program guide may display an associated local advertisement 104, as shown in the lower screen of FIG. 13.

Figure 13:
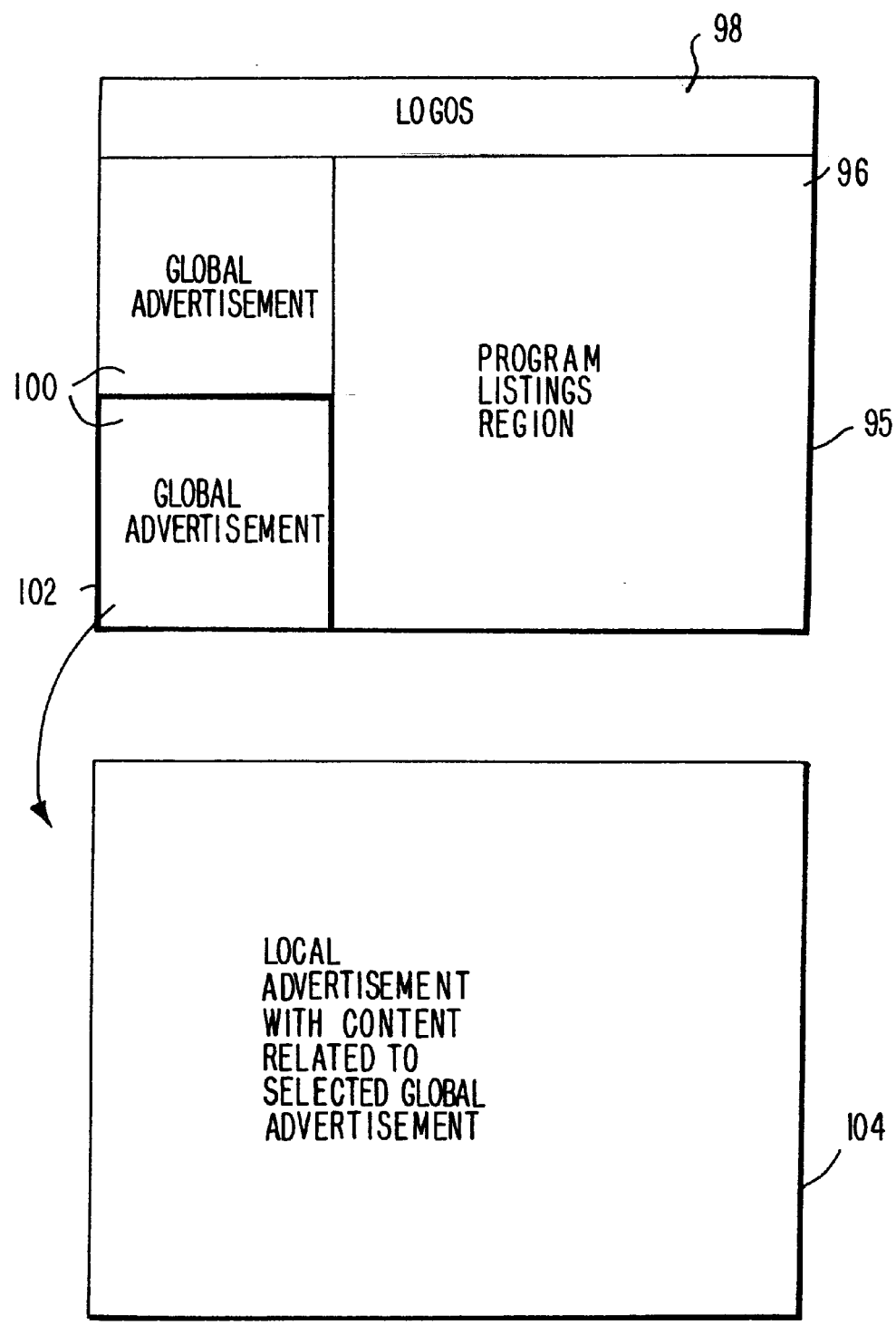
FIG. 13 is a diagram illustrating how a local advertisement may be provided when the user selects a global advertisement in accordance with the present invention.
Figure 14:
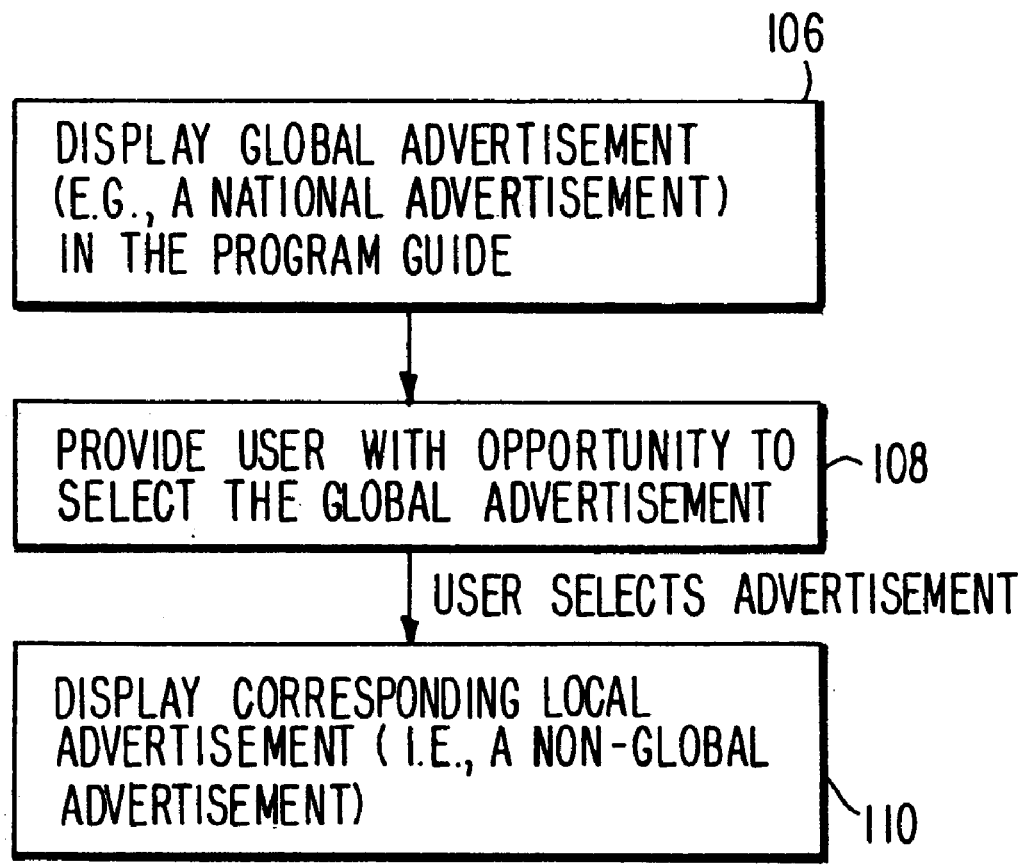
FIG. 14 is a flow chart of steps involved in providing the user with local advertising information such as shown in FIG. 13 in accordance with the present invention.

Steps involved in presenting local advertisement 104 of FIG. 13 to the user are shown in FIG. 14. At step 106, the program guide displays a global advertisement in the program guide on a suitable program guide display screen. At step 108, the program guide provides the user with an opportunity to select the global advertisement. At step 110, after the user has selected a desired global advertisement, the program guide displays a corresponding local advertisement having content that may be related to the content of the selected global advertisement.

Figure 15:
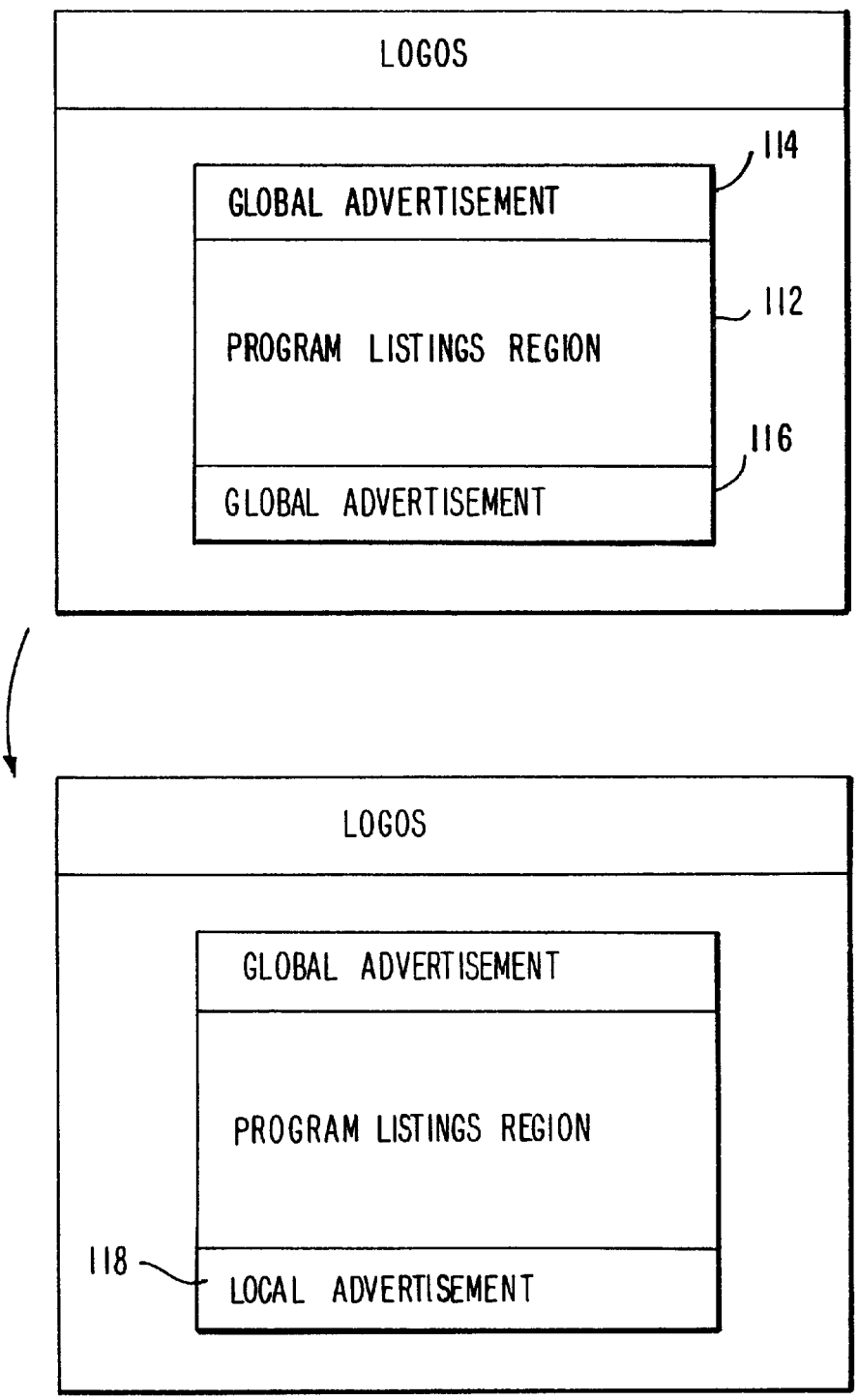
FIG. 15 is a diagram illustrating how global advertisements and local advertisements may be cycled in accordance with the present invention.

Another arrangement for displaying local advertisements is shown in FIG. 15. The upper program guide screen of FIG. 15 contains program listings region 112 and global banner advertisements 114 and 116. Periodically, local advertisements are displayed in place of the global banner advertisements. For example, as shown in the lower program guide screen of FIG. 15, local advertisement 118 has been displayed in place of global advertisement 116. The content of local advertisement 118 may be related to the content of global advertisement 116 if desired.

Figure 16:
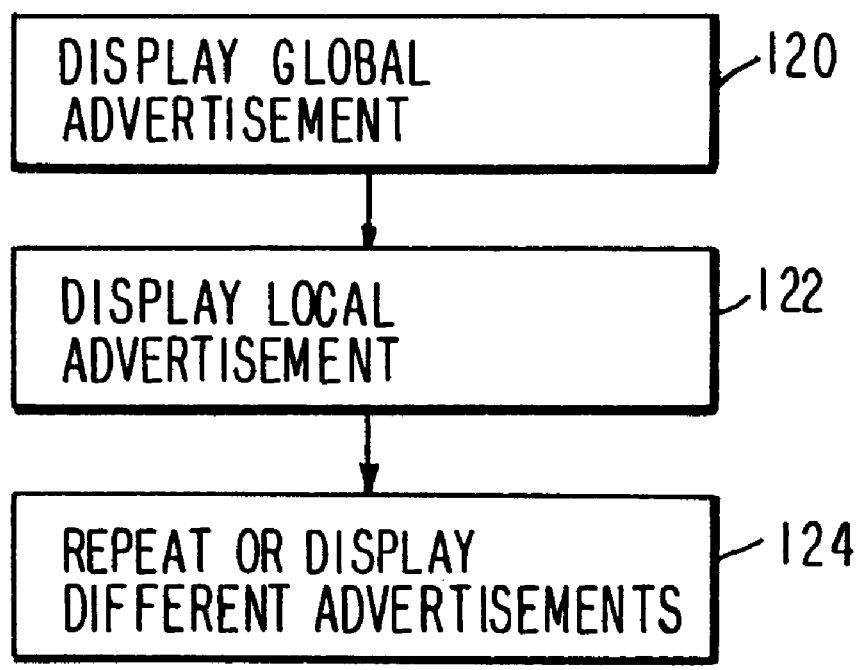
FIG. 16 is a flow chart of steps involved in displaying cycled global and local advertisements such as shown in FIG. 15 in accordance with the present invention.
Figure 17:
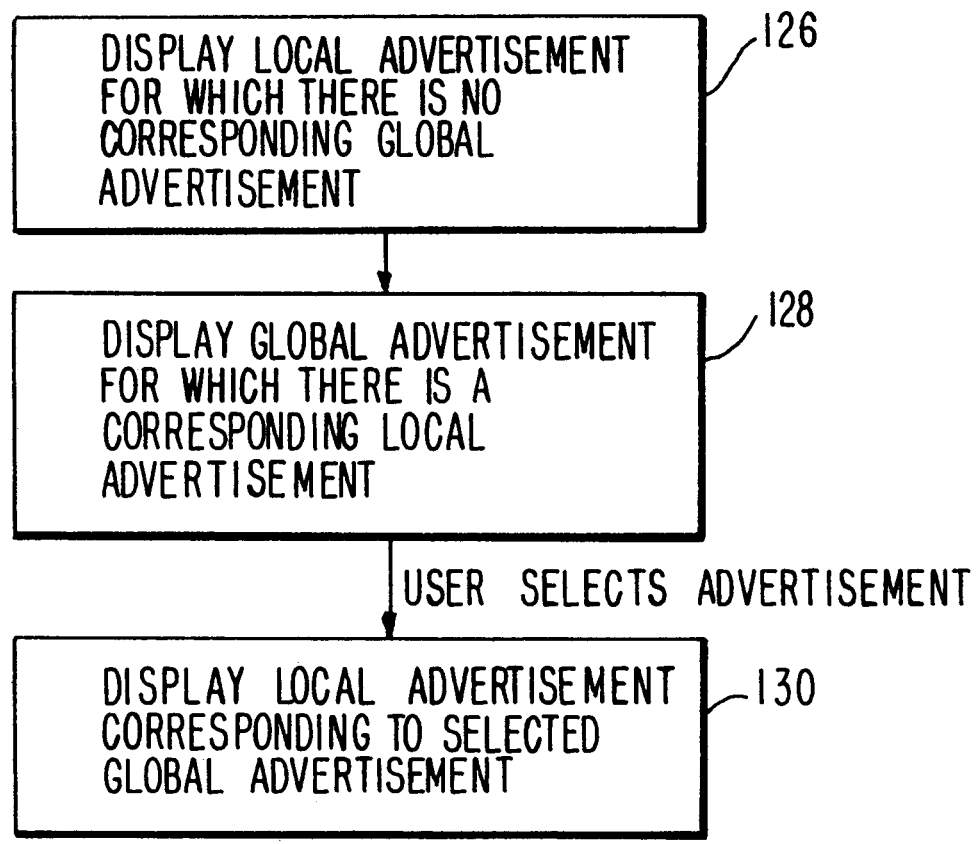
FIG. 17 is a flow chart of steps involved in displaying local advertisements in accordance with the present invention.

Steps involved in displaying local advertisements using the arrangement of FIG. 15 are shown in FIG. 16. At step 120, the program guide displays a global advertisement. At step 122, the program guide displays a local advertisement. The local advertisement may be displayed in place of the global advertisement as shown in FIG. 15. At step 124, the cycle repeats (i.e., global advertisement 116 is displayed in place of local advertisement 118 in FIG. 15, etc.). Alternatively, a different advertisement (global or local) may be displayed at step 124.

The arrangements of FIGS. 13 and 15 are illustrative only. Any suitable arrangement may be used for displaying local advertisements. For example, it is not necessary to display local advertisements in conjunction with global advertisements. Local advertisements may be displayed entirely on their own (e.g, according to a predetermined schedule or other suitable arrangement). Moreover, global and local advertisements may be displayed in any desired format, including the panel advertisement format of FIG. 13, the banner advertisement format of FIG. 15, or any other suitable format. Both global and local advertisements may be selectable.

If such advertisements are selectable, the user may be provided with an opportunity to purchase an advertised product or service. The user may place an order for a product by selecting an advertisement, may request a catalog by selecting an advertisement, may generate a coupon by selecting an advertisement, may request a telephone call from a salesperson by selecting an advertisement, may request information on how to contact a salesperson at a local store by selecting an advertisement, etc. These examples are illustrative only. Any suitable type of product or service may be promoted or ordered using a selectable advertisement if desired.

The user may also be provided with an opportunity to purchase programming by selecting an advertisement. For example, the user may be provided with an opportunity to impulse purchase a pay-per-view program. The user may also be provided with an opportunity to purchase a video-on-demand program or a near-video-on-demand program. These examples are illustrative. The user may purchase any suitable type of programming by selecting a selectable advertisement if desired.

In addition, the user may be provided with an opportunity for setting a reminder for a particular program when the user selects a selectable advertisement for a program. The program guide may also be directed to take other actions in the program guide when the user selects a selectable advertisement. For example, the program guide may be directed to record a given program when the use selects an advertisement for a that program. These examples are illustrative, the program guide may be directed to take any suitable action in the program guide when the user selects a selectable advertisement if desired.

As illustrated in FIG. 15, a local advertisement may be displayed (at step 126) for which there is no corresponding global advertisement. This type of local advertisement may be particularly suitable for advertising businesses with a small geographic region of interest (e.g., Joe's pizzeria). If it is desired to advertise a product or service that has a more national appeal, but that has a corresponding aspect that requires more localized promotion (e.g., a brand of automobile for which it is desired to promote various dealerships), then at step 128 a suitable global advertisement may be displayed and a corresponding local advertisement may be displayed by the program guide at step 130 (after, e.g., the user selects the global advertisement).

Figure 18:
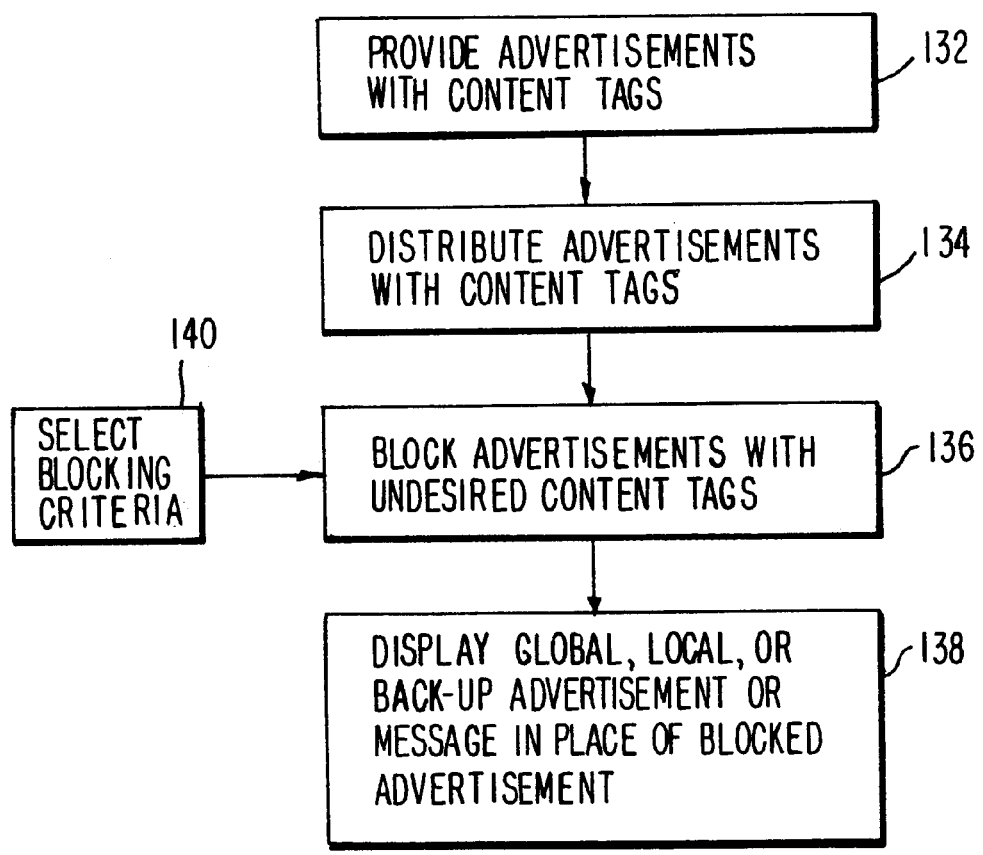
FIG. 18 is a flow chart of steps involved in providing advertisements with tags based on their content in accordance with the present invention.

Another aspect of the invention relates to providing advertisements with content tags so that users or the operators of television distribution facilities may block certain advertisements based on their content. This may be useful when certain advertisements (e.g., advertisements for adult programming) offend the sensibilities of a particular user or community. As shown in FIG. 18, advertisements may be provided with content tags at step 132 (e.g., at advertising database 50 in main facility 46). Suitable content tags include tags for graphic language, violence, and sexual content. If desired, genre tags may be provided (e.g., tags that identify the content of advertisements by programming genre such as comedy, sports, movies, etc.) Tags may also be provided that identify the content of advertisements by subject matter such as home improvement, automotive, clothing, sports equipment, shoes, photographic, electronics, musical instruments, books, etc.

At step 134, the advertisements with content tags are distributed by system 53. Advertisements with undesired content are blocked at step 136. If desired, a suitable global advertisement, local advertisement, or back-up message (e.g., a blank screen or an advertisement for a service provider) may be displayed by the program guide in place of the blocked advertisement at step 138. The advertisement displayed in place of an advertisement that was blocked because it was deemed to be offensive preferably contains inoffensive material.

The distribution and blocking of steps 134 and 136 may be performed using any suitable arrangement. For example, advertisements with content tags may be distributed in one or more data streams to user television equipment 54 by main facility 46 and television distribution facilities 52 and undesired advertisements may be filtered from such a data stream or streams at user television equipment 54. Another approach is for television distribution facilities 52 to perform filtering of the undesired advertisements. These approaches are illustrative only. Any suitable approach may be used for blocking advertisements based on content if desired. For example, user television equipment may block advertisements based on a keyword search (e.g., for words of graphic language in the text of the advertisement or for words based on an item of interest), rather than relying on content tags supplied at main facility 46.

At step 140, the user, system operator, or other entity may select the blocking (filtering) criteria to be used at step 136. For example, the system operator might block all advertisements for adult programming. The user might block all advertisements with graphic language. The user might also selectively allow advertisements for electronic equipment to be displayed by selecting the electronic equipment category. If the user selects a category such as the electronic equipment category, at step 136 all advertisements are blocked except those with a content (as indicated by content tags, keyword search, or other suitable technique) that is related to equipment.

Another aspect of the invention relates to time shifting certain advertisements. In some circumstances it may be desirable for an advertisement to be time shifted, so that it may better reach its intended audience. For example, a network television program may be broadcast at 8:00 PM eastern time and 7:00 PM mountain time (even though eastern time and mountain time are two time zones apart). If an advertisement is distributed nationally and aired just before 8:00 PM eastern time (e.g., at 7:55 PM eastern time), that advertisement (if not time shifted) will be aired at 5:55 PM mountain time. This may be undesirable, because a 5:55 PM advertisement for a 7:00 PM television program may not be as effective as a 6:55 PM advertisement for a 7:00 PM television program. Accordingly, in this situation it may be desirable to delay (time shift) the display of the 5:55 PM mountain time advertisement until 6:55 PM mountain time.

Figure 19:
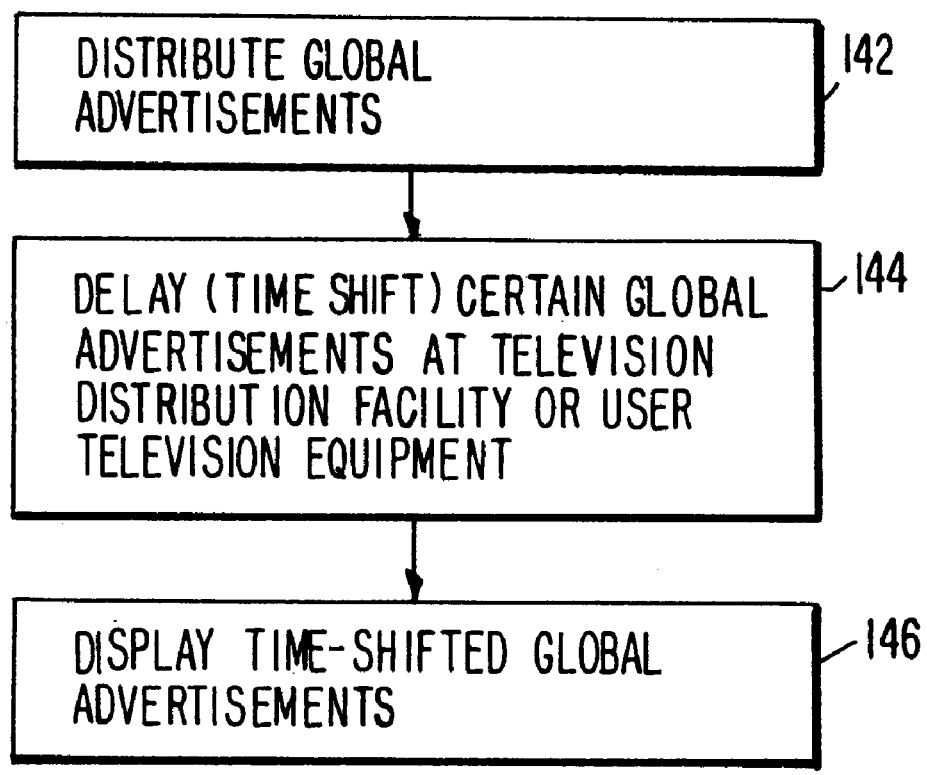
FIG. 19 is a flow chart of steps involved in time shifting certain advertisements in accordance with the present invention.

Steps involved in advertisement time shifting are shown in FIG. 19. At step 142, global advertisements are distributed. In those time zones in which it is desired to time shift a given global advertisement, the advertisement may be temporarily stored (e.g., in advertising database 57 of television distribution facility 52) at step 144. Elsewhere, the global advertisement may be displayed normally. At step 146, the time-shifted advertisements are displayed by the program guide (e.g., they are transmitted from advertising database 57 in television distribution facility 52 to user television equipment 54 and displayed by the program guide on television 62).

Another aspect of the invention relates to implementing policies related to advertisement usage by television distribution facilities 52. For example, it may be desired to prohibit television distribution facilities 52 from time-shifting certain advertisements. It may also be desired to prohibit television distribution facilities 52 from modifying a given advertisement (e.g., by overwriting that advertisement or by providing a corresponding local advertisement).

Figure 20:
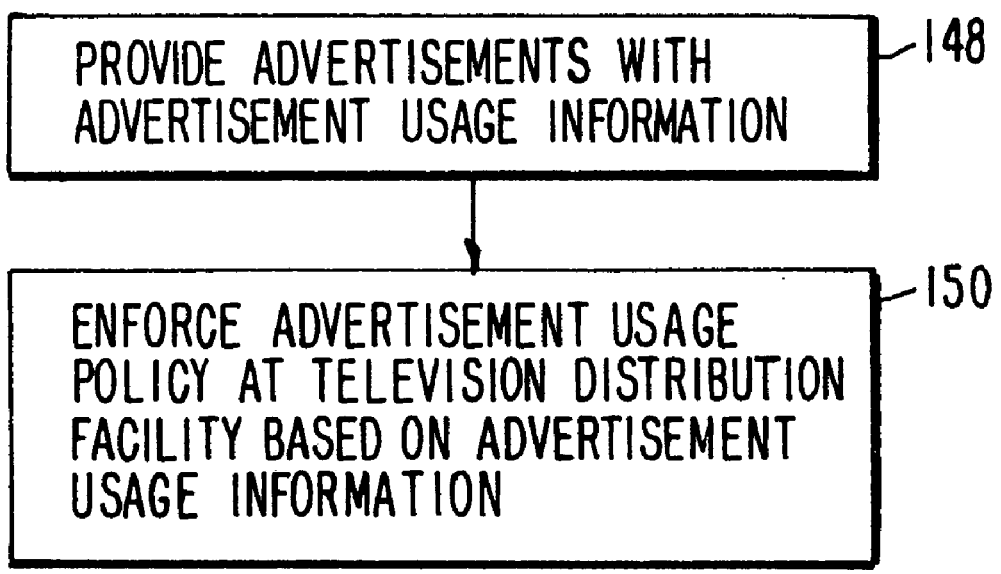
FIG. 20 is a flow chart of steps involved in implementing an advertisement usage policy in accordance with the present invention.

As shown in FIG. 20, system 44 may facilitate enforcement of advertisement usage policies by providing advertisements with information defining how those advertisements may be used (i.e., advertisement usage information) at step 148. The advertisement usage policies may be enforced at step 150, when television distribution facilities 52 attempt to time shift certain advertisements and modify certain advertisements (e.g., by attempting to overwrite such advertisements or by attempting to provide corresponding local advertisements).

Figure 21:
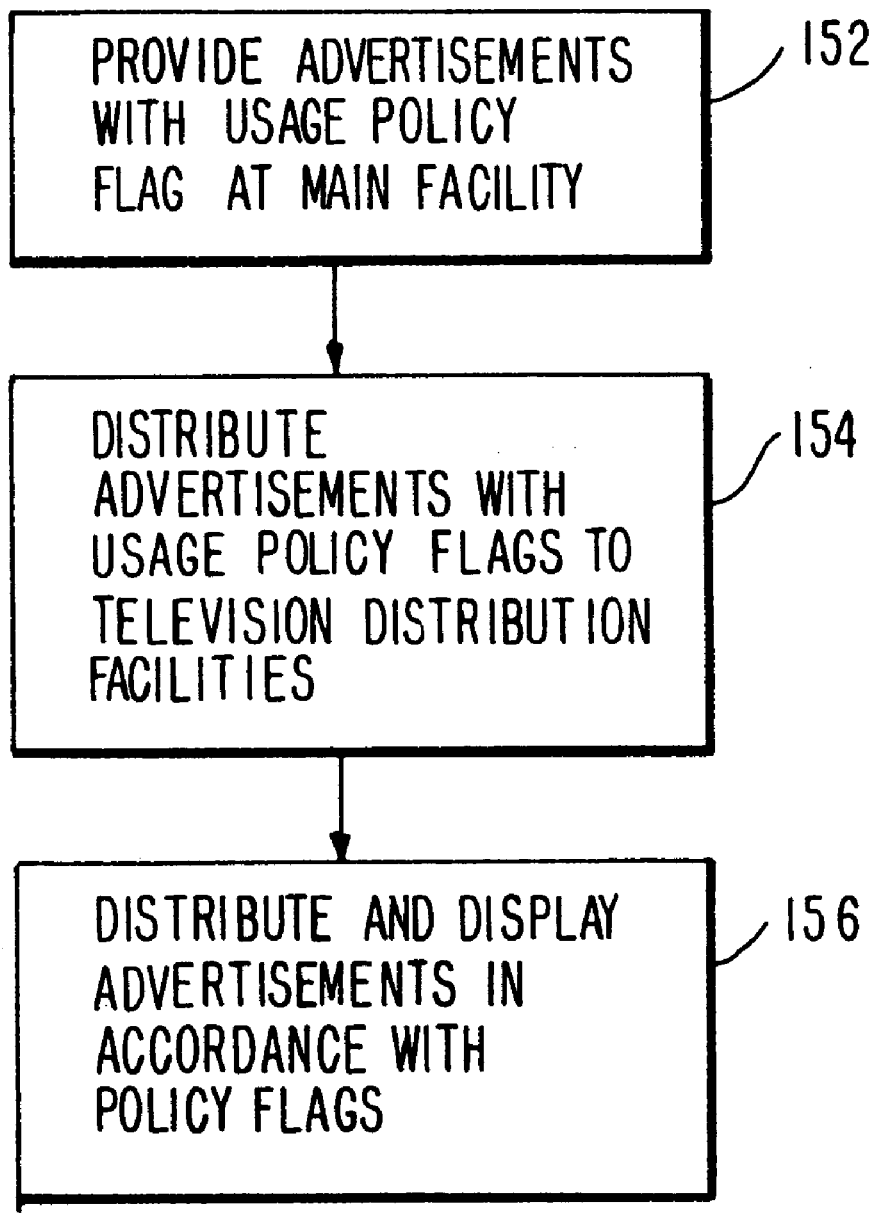
FIG. 21 is a flow chart of steps involved in implementing an advertisement usage policy using policy flags in accordance with the present invention.

One illustrative approach for implementing the steps of FIG. 20 is shown in FIG. 21. At step 152, advertisements are provided with usage policy flags (e.g., in advertising database 50 at main facility 46). The policy flags indicate how the advertisements may be used (e.g., whether the advertisements may be time shifted or modified by overwriting or by providing a corresponding local advertisement, etc.). At step 154, the advertisements with their usage policy flags are distributed to television distribution facilities 52. At step 156, television distribution facilities 52 distribute the advertisements for display by the program guide on user television equipment 54 in accordance with the advertisement usage policies defined by the policy flags. For example, if an advertisement has an accompanying policy flag that indicates no time shifting is permitted for that advertisement, a television distribution facility 52 that would otherwise desire to time shift that advertisement will not be allowed to perform such a time shifting operation, but will distribute the advertisement to user television equipment 54 normally.

Figure 22:
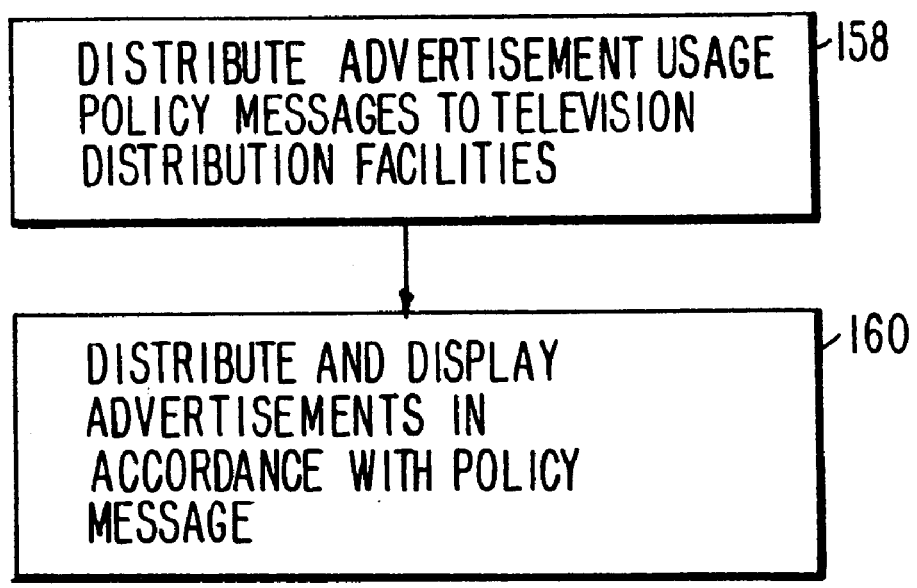
FIG. 22 is a flow chart of steps involved in implementing an advertisement usage policy using a policy message in accordance with the present invention.

Another approach for implementing the steps of FIG. 20 is shown in FIG. 22. At step 158, main facility 46 distributes an advertisement usage policy message to television distribution facilities 52 that defines the usage policies for various advertisements. At step 160, television distribution facilities 52 distribute the advertisements for display by the program guide on user television equipment 54 in accordance with the advertisement usage policies defined by the policy message. For example, if the policy message indicates that an advertisement may not be time shifted, a television distribution facility 52 that would otherwise desire to time shift that advertisement will not be allowed to perform such a time shifting operation, but will distribute the advertisement to user television equipment 54 normally.

The foregoing is merely illustrative of the principles of this invention and various modifications can be made by those skilled in the art without departing from the scope and spirit of the invention.

What is claimed is:

1. A system in which a television distribution facility is used to distribute advertisements to user television equipment on which an interactive television program guide is implemented, comprising:

means for providing the advertisements with advertisement usage information, wherein the advertisement usage information indicates whether the television distribution facility can time-shift a particular advertisement; and means for preventing the television distribution facility from time-shifting the particular advertisement when the advertisement usage information prohibits time-shifting the particular advertisement.

2. The system defined in claim 1 wherein the means for providing the advertisements with advertisement usage information comprises means for providing the advertisements with usage policy flags at a main facility.

3. The system defined in claim 1 further comprising means for distributing and displaying the advertisements in accordance with policy flags.

4. The system defined in claim 1 wherein the means for providing the advertisements with advertisement usage information comprises means for distributing an advertisement usage policy message to the television distribution facility.

5. The system defined in claim 1 further comprising means for distributing and displaying the advertisements in accordance with an advertisement usage policy message.

6. A method for using a system in which a television distribution facility is used to distribute advertisements to user television equipment on which an interactive television program guide is implemented, comprising the steps of:

providing the advertisements with advertisement usage information, wherein the advertisement usage information indicates whether the television distribution facility can time-shift a particular advertisement; and preventing the television distribution facility from time-shifting the particular advertisement when the advertisement usage information prohibits time-shifting the particular advertisement.

7. The method defined in claim 6 wherein the step of providing the advertisements with advertisement usage information comprises the step of providing the advertisements with usage policy flags at a main facility.

8. The method defined in claim 6 further comprising the step of distributing and displaying the advertisements in accordance with policy flags.

9. The method defined in claim 6 wherein the step of providing the advertisements with advertisement usage information comprises the step of distributing an advertisement usage policy message to the television distribution facility.

10. The method defined in claim 6 wherein the step of enforcing the advertisement usage policy comprises the step of distributing and displaying the advertisements in accordance with an advertisement usage policy message.

11. A computer readable medium encoded with machine-readable instructions for use in a system in which a television distribution facility is used to distribute advertisements to user television equipment on which an interactive television program guide is implemented, the machine-readable instructions comprising:

providing the advertisements with advertisement usage information, wherein the advertisement usage information indicates whether the television distribution facility can time-shift a particular advertisement; and preventing the television distribution facility from time-shifting the particular advertisement when the advertisement usage information prohibits time-shifting the particular advertisement.

12. The computer readable medium defined in claim 11, wherein the machine-readable instructions that provide the advertisements with advertisement usage information further comprises providing the advertisements with usage policy flags at a main facility.

13. The computer readable medium defined in claim 11, further comprising distributing and displaying the advertisements in accordance with policy flags.

14. The computer readable medium defined in claim 11, wherein the machine-readable instructions that provide the advertisements with advertisement usage information further comprises distributing an advertisement usage policy message to the television distribution facility.

15. The computer readable medium defined in claim 11, further comprising distributing and displaying the advertisements in accordance with an advertisement usage policy message.

16. A system in which a television distribution facility is used to distribute advertisements to user television equipment on which an interactive television program guide is implemented, comprising:

a main facility that provides the advertisements with advertisement usage information to the television distribution facility, wherein the advertisement usage information indicates whether the television distribution facility can time-shift a particular advertisement; and wherein the television distribution facility is prevented from time-shifting the particular advertisement when the advertisement usage information prohibits time-shifting the particular advertisement.

17. The system defined in claim 16, wherein the main facility receives the advertisements with usage policy flags.

18. The system defined in claim 16, wherein the television distribution facility distributes the advertisements to the user television equipment for display in accordance with policy flags.

19. The system defined in claim 16, wherein the main facility distributes an advertisement usage policy message to the television distribution facility.

20. The system defined in claim 1, wherein the television distribution facility distributes the advertisements to the user television equipment for display in accordance with an advertisement usage policy message.

* * * * *

UNITED STATES PATENT AND TRADEMARK OFFICE
CERTIFICATE OF CORRECTION

PATENT NO. : 6,799,326 B2
DATED : September 28, 2004
INVENTOR(S) : Boylan et al.

It is certified that error appears in the above-identified patent and that said Letters Patent is hereby corrected as shown below:

Column 1,
Line 6, change "APPLICATIONS" to -- APPLICATION --.

Column 11,
Line 13, change "for a that" to -- for that --.
Line 41, insert -- . -- after ")".

Signed and Sealed this

First Day of November, 2005

JON W. DUDAS
*Director of the United States Patent and Trademark Office*